US 8,135,780 B2

(12) United States Patent
Gillum

(10) Patent No.: US 8,135,780 B2
(45) Date of Patent: Mar. 13, 2012

(54) EMAIL SAFETY DETERMINATION

(75) Inventor: Eliot C. Gillum, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 11/566,071

(22) Filed: Dec. 1, 2006

(65) Prior Publication Data

US 2008/0133672 A1  Jun. 5, 2008

(51) Int. Cl.
*G06F 15/16* (2006.01)
*G06F 3/048* (2006.01)
*G06F 3/00* (2006.01)

(52) U.S. Cl. ........ 709/206; 709/207; 715/821; 715/744; 715/752

(58) Field of Classification Search .......... 709/206, 709/207, 204, 205; 715/821, 752, 744
See application file for complete search history.

(56) References Cited

U.S. PATENT DOCUMENTS

| | | | |
|---|---|---|---|
| 5,619,648 A | | 4/1997 | Canale et al. |
| 6,507,866 B1 * | | 1/2003 | Barchi ........................ 709/207 |
| 6,546,416 B1 | | 4/2003 | Kirsch |
| 7,016,939 B1 | | 3/2006 | Rothwell et al. |
| 7,051,077 B2 | | 5/2006 | Lin |
| 7,058,684 B1 * | | 6/2006 | Ueda ............................ 709/206 |
| 7,653,879 B1 * | | 1/2010 | Sareen et al. ................ 715/752 |
| 7,747,690 B2 * | | 6/2010 | Kraenzel et al. ............. 709/206 |
| 2001/0037315 A1 * | | 11/2001 | Saliba et al. .................... 705/70 |
| 2003/0069933 A1 * | | 4/2003 | Lim et al. ..................... 709/206 |
| 2004/0093384 A1 | | 5/2004 | Shipp |
| 2004/0199596 A1 | | 10/2004 | Nutkis |
| 2004/0210640 A1 * | | 10/2004 | Chadwick et al. ............ 709/207 |
| 2005/0022008 A1 | | 1/2005 | Goodman et al. |
| 2005/0044155 A1 * | | 2/2005 | Kaminski et al. |
| 2005/0102366 A1 * | | 5/2005 | Kirsch .......................... 709/207 |
| 2005/0120019 A1 * | | 6/2005 | Rigoutsos et al. ................ 707/6 |
| 2005/0188024 A1 | | 8/2005 | Singer |
| 2005/0262209 A1 | | 11/2005 | Yu |
| 2006/0015563 A1 * | | 1/2006 | Judge et al. .................. 709/206 |
| 2006/0168017 A1 * | | 7/2006 | Stern et al. .................... 709/206 |
| 2006/0179113 A1 * | | 8/2006 | Buckingham et al. ........ 709/206 |
| 2006/0212522 A1 * | | 9/2006 | Walter et al. .................. 709/206 |
| 2006/0277259 A1 * | | 12/2006 | Murphy et al. ............... 709/206 |
| 2007/0005702 A1 * | | 1/2007 | Tokuda et al. ................ 709/206 |
| 2007/0027992 A1 * | | 2/2007 | Judge et al. .................. 709/227 |
| 2007/0061404 A1 * | | 3/2007 | Maller .......................... 709/206 |
| 2007/0118759 A1 * | | 5/2007 | Sheppard ...................... 713/188 |
| 2008/0104184 A1 * | | 5/2008 | Wilson et al. ................. 709/206 |
| 2008/0134313 A1 * | | 6/2008 | Lord ............................. 726/10 |
| 2008/0168144 A1 * | | 7/2008 | Lee ............................. 709/206 |
| 2008/0270540 A1 * | | 10/2008 | Larsen ......................... 709/206 |

OTHER PUBLICATIONS

Michael Osterman, "Reputation based Mail Flow Control" 2002., www.ironport.com, 1-5.*

(Continued)

*Primary Examiner* — Joseph Avellino
*Assistant Examiner* — Aftab Nasir Khan
(74) *Attorney, Agent, or Firm* — Vierra Magen Marcus & DeNiro LLP

(57) ABSTRACT

A computer implemented method for assisting email users recognizes deviations in characteristics of emails sent from a particular source identifier or "source ID" to a user. After one or more emails having a pattern of characteristics are received, an action on subsequent emails is performed, such as warning users when the subsequent emails received from the source ID match or don't match the pattern. Characteristics from a particular source ID are determined based on whether the addressee reads the email from the source ID. Various levels of warning based on the characteristics identified and the deviation of any email from the characteristics of previous emails.

16 Claims, 8 Drawing Sheets

OTHER PUBLICATIONS

Ciphertrust, "New Technology Showing Promise Against Unwanted Email", Messaging Security Resources—Stop Email Spoofing with Sender ID, May 10, 2005, http://www.ciphertrust.com/resources/articles/articles/sender_id.php.

Apache Software Foundation, "SpamAssassin", Nov. 7, 2005, http://wiki.apache.org/spamassassin/ SpamAssassin.

Stolfo, et al., "A Behavior-based Approach to Securing Email Systems", Columbia University, 2003, USA.

* cited by examiner

EMAIL SAFETY DETERMINATION

BACKGROUND

The most common use of the Internet is communication via electronic mail. Common forms of web-based email services are provided by Email Service Providers (ESPs) examples of which include Yahoo! Mail, Microsoft Live Mail, Google GMail, and others. Each of these providers receives a large number of messages which are inbound to the providers, many of which are phishing messages, spam messages or unsolicited bulk-email messages. These provides also receive a number of messages from legitimate institutions whose customers have provided their web-based email as the primary means of electronic communication.

Large scale ESPs can stop a limited amount of spam and phishing email using various spam detection mechanisms, including comparing the sending IP address to a list of known spammer addresses or confirming the validity of the sending IP address with a Domain Name Service (DNS) server. Though typical anti-spam applications remove a portion of incoming spam from user accounts, they do not prevent all spam from being delivered and can sometimes result in "false positives", where legitimate mail is marked as spam.

Phishing emails are a bit more difficult to detect, as they may appear to users to be legitimate emails from reputable on-line vendors. Occasionally, these emails pass by spam filters when their pattern has not been recognized by the spam filter. Conversely, legitimate emails can sometimes be caught by spam filters. Users need to regularly check their spam folder to ensure legitimate emails are not incorrectly routed there.

Some providers allow users to "white list" email addresses using various mechanisms. For example, bulk mail routed to a user's spam or deleted items folder may be marked as "not spam" and future messages from the "from" address identified on a whitelist are then allowed to pass to the user's inbox the future.

Current systems strive to keep users safe from nefarious messages, while still allowing messages the users want to view through to the user. Users may demonstrate a pattern of reading mail from sources which might otherwise have characteristics which lead existing systems to identify them as suspicious. For example, users may consistently read emails from a banking institution having text which closely resembles phishing emails made to resemble emails from the institution.

SUMMARY

The technology, roughly described, recognizes deviations and characteristics of emails sent from a particular source identifier or "source ID" to a user. The source ID can be user email address, a domain, or a group of Internet protocol (IP) addresses, or any manner of identifying a common source for emails. Characteristics of emails transmitted from a source ID to a particular user are determined and associated with the source ID. After one or more emails having a pattern of characteristics are received, users are warned when subsequent emails received from the source ID match or don't the pattern. Emails not matching the pattern are more likely not to be from the source ID. Characteristics from a particular source ID are determined and the acceptability of the email evaluated based on whether the addressee reads the email from the source ID. The technology can include various levels of warning based on the characteristics identified and the deviation of any email from the characteristics of previous emails.

In one embodiment, the method includes a computer implemented method for assisting email users. The method includes recording a pattern of characteristics associated with emails sent from a sender identity and determining whether characteristics of new emails received from the sender identity match the pattern. If the characteristics in any email do not match the pattern, a warning is issued. In one embodiment, the steps of determining and issuing occur when a user views an email.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is described herein for implementing a system which recognizes deviations and characteristics of emails sent from a particular source identifier or source ID, such as a user email address, a domain, or a group of Internet protocol (IP) addresses, to a receiving user. The receiving user can utilize an web based email system, or may be a user of an application program on an individual computing device. In accordance with the technology, the characteristics of emails transmitted from a source ID to a particular user are determined and associated with the source ID. After one or more emails having certain characteristics are received, the system can indicate whether subsequent emails received from the source ID match the earlier characteristics and are thus more likely to be from the source identifier. Characteristics from a particular source ID are determined and the authenticity of the email estimated based on whether or not the addressee reads the email from the source ID. When emails are received purporting to be from the source ID do not share the same characteristics as one or more previous emails from the source, the system can warn the user that the email does not appear to be the same as pervious email from the source. The technology can include various levels of warning based on the characteristics identified and the deviation of any email from the characteristics of previous emails.

The technology is based on an assumption that email regularly read from a particular source should share characteristics with previous emails from that particular source. Deviations in emails from a particular source would indicate that the email is less likely to be from that particular source.

Figure 1A:
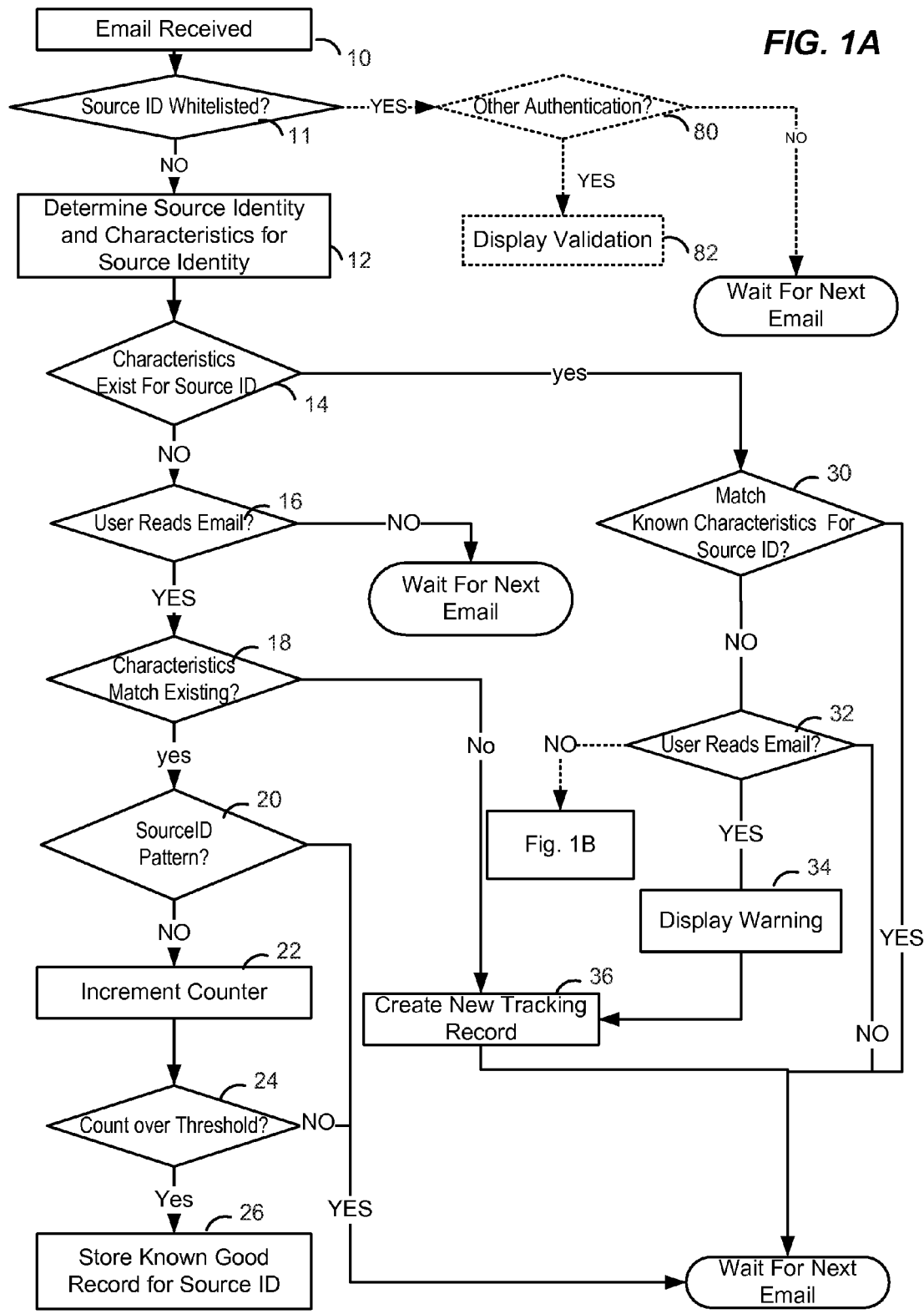
FIG. 1A depicts a general method in accordance with the technology discussed herein.

FIG. 1 illustrates a method in accordance with the present invention for recognizing deviation in the characteristics of emails received from a particular source identifier. At step 10, an email is received from a particular source identifier. As noted above, a source ID can be broadly defined. In one embodiment, a source ID is simply an email address in the FROM, REPLY TO, or SENDER fields of an email message purporting to identify the source of the email. Alternatively, some users may have several email addresses, and the source ID may be a group of email addresses associated with a particular user. Still further, a source ID may be a domain, an IP address indicating the source email system, or a group of IP addresses from which mail from a sender's email address is normally provided.

At step 11, a white list of source ID from which a user always wants to receive mail is checked. If the source ID is on the white list, the method simply waits for the next email to the user. In step 12, the source identity and any one or more characteristics of the email emanating from a source identity are determined. Step 12 can include determining such things as whether the email passes authentication processes Sender ID or DomainKeys Identified Mail (DKIM), or whether the email comes from the same IP address or group of IP addresses. In this case, the determination at step 12 recognizes "authentication" characteristics of the mail. However, other characteristics of the email may be recognized. Characteristics of the email may be based on text characterization of the email, where a determination of regular elements of the email message such as the particular signature one sender uses in an email, whether the particular sender uses capitalization regularly, or whether the user includes a particular form or RE line in a message, may all be used to characterize an email message at step 12. Other characteristics such as elements in the mail header including charset, encoding, or format may also be used. This preceding list should be considered examples of classes of characteristics, where the true set of characteristics is limited only by state-of-the-art text classification techniques, including spam filter feature extraction. One or more of each of the aforementioned characteristics may be determined for each email relative to the source ID of the email. A further characteristic may be the number of times a particular IP associated with a particular user is seen over time. For example, if email is consistently seen from a user over a particular period of time associated with a first IP address, and email ceases coming from that IP address over some other period of time, the system can unlearn the first IP associated with that particular user.

At step 14, a determination is made as to whether any characteristics (or set of characteristics) have been previously associated with a particular source ID For example, it may be determined that one regularly receives email from a particular source and that email always passes Sender ID. At step 14, if any one or more characteristics has already been associated with a particular source identifier, then at step 30, a determination is made for the email received at step 10 as to whether or not its characteristics match the known characteristics for the source ID. If the email matches the known characteristics, an assumption can be made that the email is likely from the same source as previous emails from the source ID and no warning need be displayed. If an email is received at step 10 purporting to be from a particular source ID which does not match the characteristics as determined at step 30, then, at step 32, when the user reads the email, at step 34 the technology will display a warning to the user indicating that the email purporting to be from a particular source does not match the characteristics of email previously seen from such source. The warning may take many forms, as disclosed in the figures below. If the user never reads the email at step 32, no action need be taken on the mail message.

Figure 1B:
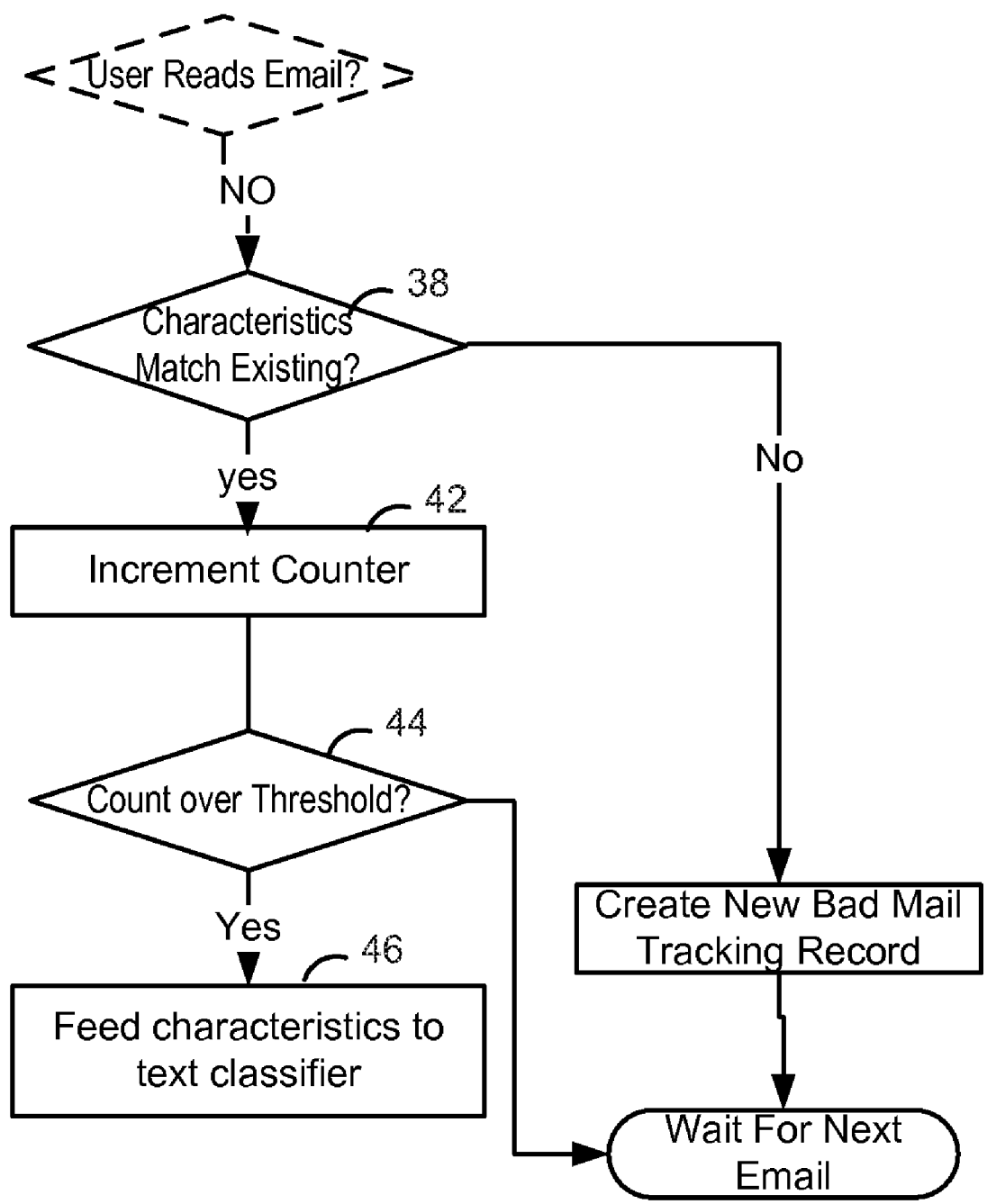
FIG. 1B is a method which may be used in conjunction with the method in FIG. 1B.

Optionally, if a user never reads the email at step 32, the method of FIG. 1B may be performed. At step 38, a check is made to determine whether any existing tracing records exist for the source ID, where the characteristics are associated with a user not reading mail from the source ID. If not, a new "known bad" tracking record may be created and the method waits for the next email. If so, then a counter of the "known bad" email characteristics for the source ID is incremented, and if the source is over a threshold at step 44, such information may be fed into a text classifier such as a spam or phishing filter, as it could be especially relevant for detecting such malfeasance. Increased thresholds and care are required when using this "negative" information, as there can be valid reasons for users not to read mail from a sender (e.g. all the info they desire is present in the subject).

If at step 14, no characteristics for a particular source ID have been associated with the source ID, when the user reads an email at step 16, a determination will be made at step 18 as to whether any characteristics have yet been identified for the particular source ID. Again, if the user does not read the email at step 16, no action need taken. Alternatively, the determination steps may occur before a user attempts to read the email. If at step 18, no existing characteristics have been associated with a source identifier, a initial association 36 may be created. The initial association may comprise a tracking record linking the source ID with a particular set of characteristics. The tracking record may be any manner of storing the association of characteristics with the source ID. Optimally, this may be performed by storing easily accessible records in a data structure in a database. Multiple occurrences of the same set of characteristics with respect to a source ID may result in multiple tracking records and a pattern based on the records established after some number of occurrences of the same characteristics in emails relative to the source ID is seen.

If at step 18, characteristics have been found which match source I.D., (for example, previous tracking records are found for the source ID) a determination is next made as to whether or not a pattern has established for the source ID at step 20. A pattern can result from the receipt of one or more messages having the same characteristics. For example, one may determine that a pattern exists when a user reads a minimum of 2-10 email messages from the same source ID which all pass Sender ID. In this example, the pattern is that messages from this sender should pass Sender ID. A known good record may be stored when a pattern of characteristics is seen with respect to a source ID. The pattern may be determined as a result of any frequency and occurrence of the particular characteristics relative to the source ID If no known good record exists at step 20, then a counter can be incremented for set of characteristics known for that Source ID. At step 24, when the count of the number of times the particular set of characteristics has been seen (exceeding some threshold, such as 2-10 times,) a pattern for the source ID is established at step 26. In one embodiment, the necessary count is a few as one occurrence, but advantageously, the frequency threshold is some greater number of occurrences.

In a further embodiment, as indicated at step 80, even where the user has white listed a source ID, additional authentication mechanisms like sender ID or DKIM could be taken with that information to provide a warning/affirmation 82 with each message in the absence of a pattern. Similarly, even if a particular message deviates from a known pattern, the presence of successful authentication might soften or eliminate the warning.

It should be understood that once a known good or known bad record is created, it may be eliminated or confirmed over time. For example, if a substantial number of the same pattern of characteristics is seen, the record may be made permanent. Similarly, if a pattern of characteristics is not seen for some long period of time, the records may be deleted.

Figure 2:
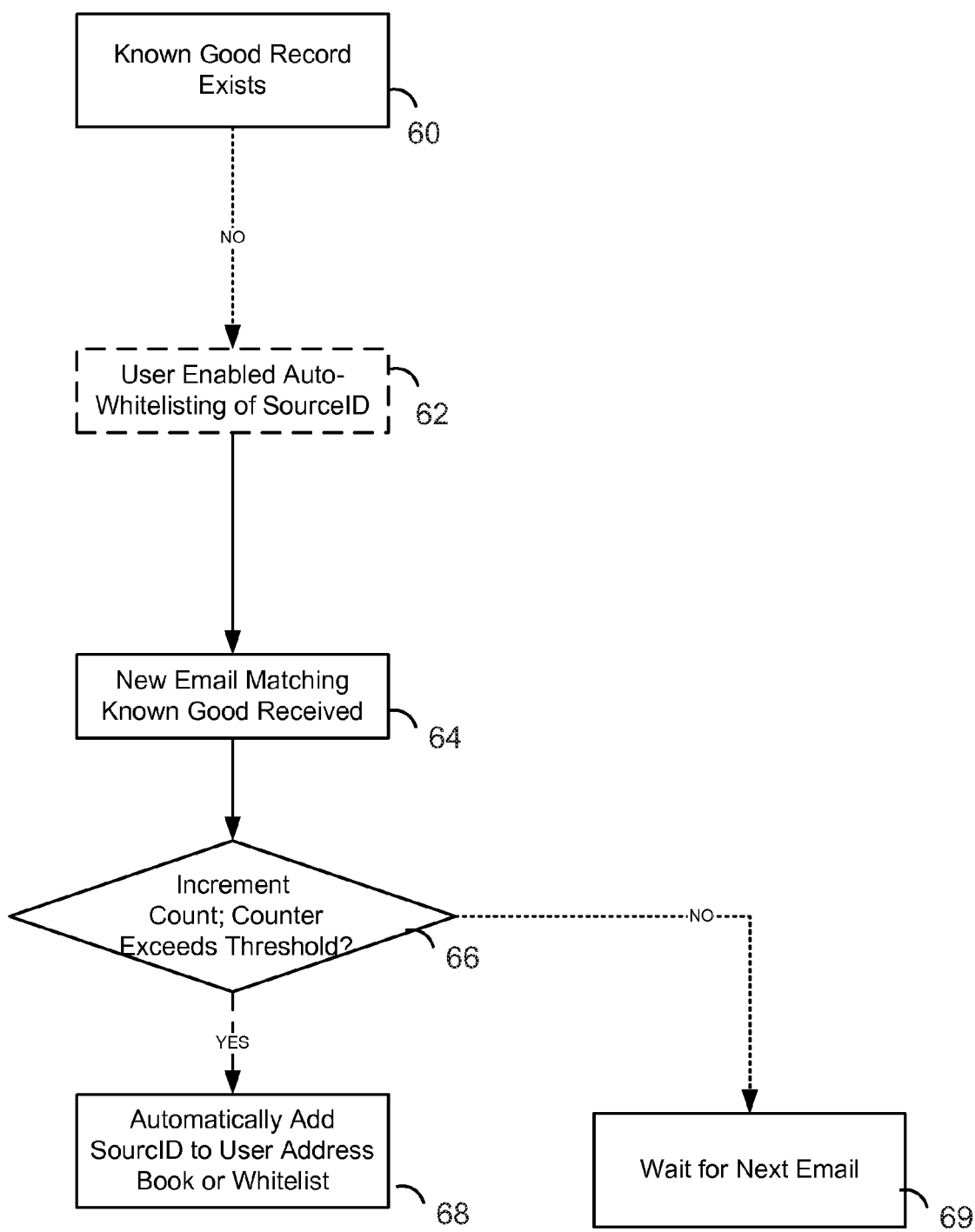
FIG. 2 depicts a method for white-listing sources in accordance with the technology discussed herein.

FIG. 2 shows an additional method for automatically white listing source identifiers which have passed the frequency test at step 66. In essence, automatic white listing is provided as a feature of having a "known good" record and thus may happen immediately (or at some later point) on the known good determination. If a known good record exists at step 60, the technology may optionally provide the user with the ability to enable an auto white-listing feature at step 62. When a new email matching a known good record is received at step 64, an auto-white-list counter may be incremented. When the counter exceeds a set minimum number of emails matching known good characteristics for a source ID, the system can automatically white-list the source ID at step 64. In this case, once a user has read a sufficient number of emails to indicate that the user is interested in seeing emails from the particular source ID, the user white listing function can be performed automatically on behalf of the user reading the emails. In effect, white listing can be a side-effect of having a "known good" record and thus happen immediately on the "good" determination.

Figure 3:
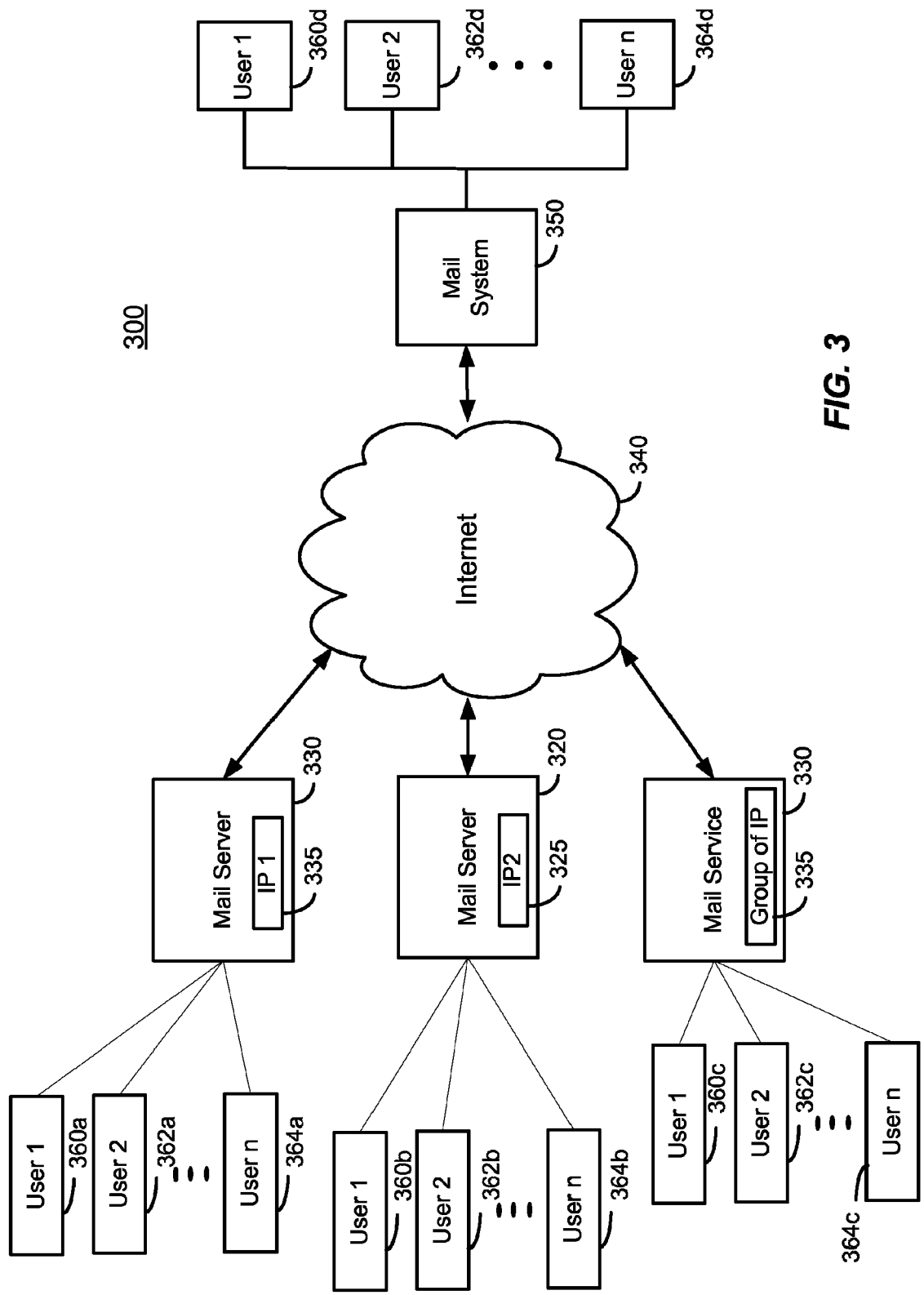
FIG. 3 is an exemplary environment for implementing the technology discussed herein.

FIG. 3 shows an exemplary environment in which the technology of the present invention can operate. As shown in FIG. 3, a plurality of sending users 360A, 362A, 364A, 360B, 362B, 364B, 360C, 362C, 364C interact with respective mail servers 330, 320 or an Internet email service 330 to transmit email messages to a receiving email system 350 and users 360D, 362D and 364D. It would be understood that the method of interaction with mail servers 330, 320 and 330 generates Internet standard email traffic via Internet 340 to and from any of the respective servers or mail systems indicated in FIG. 3, and to any of the individual users shown therein.

Figure 4:
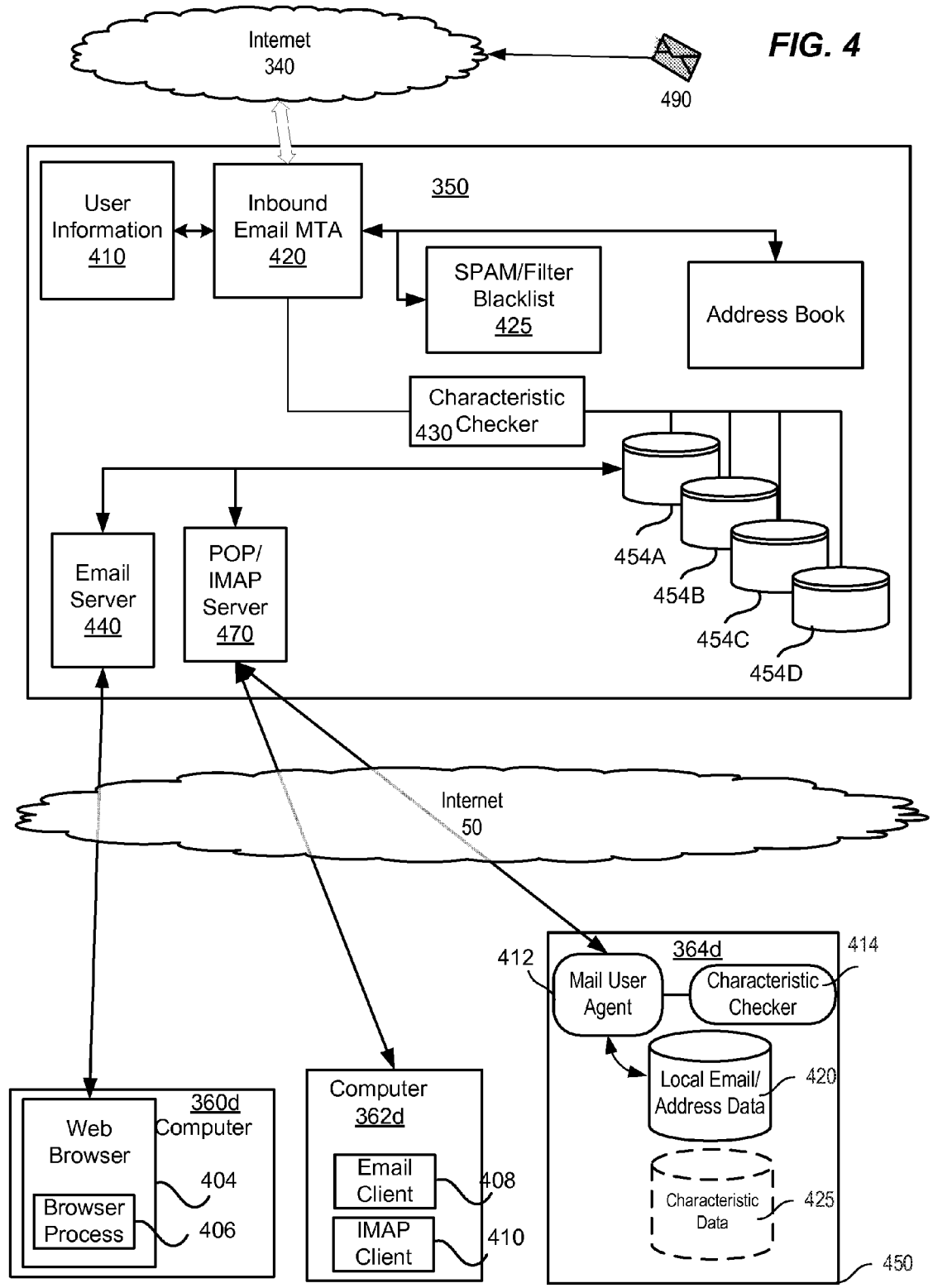
FIG. 4 is a depiction of an email system and connections thereto in accordance with FIG. 3.

In the example shown in FIG. 3, mail system 350 is a mail system such as that shown in FIG. 4 provided by an ESP such as Yahoo! Mail, Microsoft Live Mail, Google GMail or an enterprise service provider. In the foregoing methods, a sender identifier can be associated with any one of the users, any of the mail servers 330, 320, an Internet email service 330, a group of IPs 335, or individual IPs 335, 325, as discussed above. Individual users may be identified by a particular email address, the IP address, the mail server domain, or a group of IPs or domains.

Any number of methods are available for determining blocks of IPs which should be associated with a source ID. In one embodiment, as soon as two IPs within the same block are "known good", authorization of the block may be performed by first determining the entire block. In one example, a WHOIS search may be performed for all IPs blocks associated with the source IP. In another alternative, patterns in source IDs could be determined using PTR records. PTR records map IP addresses to domain names and allow determining a source ID based on the appearance of a pattern of IPs. For example, if a check of PTR records shows that a user (or group) consistently read or don't read emails from a particular domain, known good or known bad classifications may be applied to IPs resolving to the domain as a whole for that source ID. Known TLDs could be eliminated from the set of eligible such domains. In a further example, one may use a WHOIS or BGP global routing table search to identify an internet service provider (ISP), autonomous system number (ASN), or any number of unique identifiers associated with the addresses to determine blocks of IPs associated with the original IP. One or more authorization algorithms may then be applied to identify the source ID as an IP block or other grouping of IPs determined from the original IP set.

In yet another alternative, multiple domain or IP group identifiers may become part of the known good record. For example, one may associate as many unique characteristics a domain or IP group that have been authorized with the source ID record. Note that multiple identifiers can all be associated with a known good record. Where multiple identifiers are associated with a record, a weighting may be assigned to the identifiers and the weighting would allow those identifiers with a higher weighting to take precedence in indicating whether the message was known good or potentially bad.

As shown in FIG. 4, an email service 350 includes a number of components and services for users having accounts with the service. Mail system 350 receives messages 490 via Internet 140 to an inbound email message transfer agent (MTA) 420. The MTA acts with a user information data store 410 to deliver messages to a number of data servers 454A-454D. User information store 410 includes login information for users having accounts with the email service 350 and may direct mail to one or more of the storage servers 454A-454D. It will be recognized that each user having an account with mail system 150 may have mail stored on any or more of the storage servers 454A-454D. Mail system 350 may include a spam filter/black list server or process 425 which checks inbound messages for characteristics identifying the email as spam. In one embodiment, user information server 410, inbound email MTA 420, address book 425, storage servers 454A-454D, email server 440, and pop/IMAT server 470 are separate and distinct servers. However it should be recognized that any one of these particular servers provides services which may be combined on any combination of servers or a single server, and the particular hardware implementation of the email service 350 described in FIG. 4 is merely exemplary of the services provided by the email service 350.

Users operating computers 360d, 362d, 364d interact with, for example, a web-based email server 440, or a POP/IMAP server 470 to retrieve mail from the storage servers 454A-454D. An online address book 435 may be maintained for each individual user having an account with the enterprise email service 350. User 164A using computer 360d may interact with email server 440 via a web browser 404 instituting a browser process to read messages stored on any one of the stored servers. User 164 via operating computer 362d interacts with a POP/IMAP server 470 via an email client 408 or an IMAP client 410.

To implement the methods discussed in FIGS. 1 and 2, a characteristic checker application 430 is provided. It will be understood that the characteristic checker 430 may occur on any one or more of the servers shown in FIG. 4. For instance, text extraction may occur on the MTA as part of spam filtering and may be passed to the storage systems 454A-454D. The characteristic checker performs the method discussed above with respect to FIG. 1 on inbound messages to system 350 for each particular user having an account with the enterprise e mail environment 150. The characteristic checker may include a text classifier which can determine patterns, such as signatures, in received email messages. In an alternative embodiment, the characteristic checker technology discussed herein may be performed on a single client machine. A user operating computer 364d may have a mail user agent 412 such as email client 408 or IMAP client 410 which downloads email from the email service 350 to a local email data store 420. The characteristic checker 414 may reside on the local machine and have a characteristic database 425 which checks mail when viewed by the user locally on machine 364d Hence, the method of FIGS. 1 and 2 can be performed on an server farm or on an individual client machine as shown in FIG. 4. In one embodiment, the characteristic checker generates a row or record in the database for each email tracked. Each row comprises a tracking record for a particular email. This data may be stored on a separate database, or the checker 420 and the characteristic data may be stored on data servers 454A-454D.

System 350 allows for an additional feature of the technology to be implemented. In alternative embodiments, groups of users can be culled together to provide an initial set of characteristic data for a source ID, but the initial set of data could be overridden by an individual user. For example, suppose a group of individuals consistently see email from a user having an ID of a user address user@foo.com indicating that user@foo.com always fails Sender ID, but is normally read by the group. This could result in a pattern that all mails from foo.com (or even user@foo.com) should fail Sender ID. The benefit of extrapolating to the group is that further members of the group do not require as much time to learn the pattern. However, the data that mail from user@foo.com fails Sender ID may result from the emails being sent from a forwarding address such that normally provided by any number of higher education institutions which allow their students and former students to have a redirecting email address. Other cases where this problem exists is where a user forwards a story or other message using a site which allows the user to generate emails and forward the emails directly from the site. Sharing group information with all users in the system 350 would potentially result in a situation where e mails from a particular user@foo.com are attributed with incorrect characteristics for some users other than the group. This particular characteristic would present false data to the balance of any others on system 350 with whom this data is shared. Hence, group data for a source ID may provided as a starting point, but users on system 350 may be allowed to over-ride such data.

In an alternative embodiment, each of the aforementioned evaluation characteristics can be weighted so that characteristics which are strong identifiers of the source of the email can provide a greater degree of warning when deviated from. For example, users may frequently change an IP address in cases where a user has a dynamic IP assigned by a high speed Internet service with whom they normally connect. The characteristic of an email IP address associated with a user is thus a weak identifier of a characteristic of the particular user source ID Other indicators, such as whether an email address normally passes sender ID would be a stronger identifier that the email could be problematic.

In a further embodiment, in the system 350 such as that shown in FIG. 4, a mail system 350 has knowledge of any source identifiers group of email addresses. For example where a particular user has a number of email addresses, all email addresses in this group associated with the user can be considered a single source identifier. In system 350, user information 410 may be used to associate each of the user's email information with a unique identifier fort the user of mail system 350.

Figure 5:
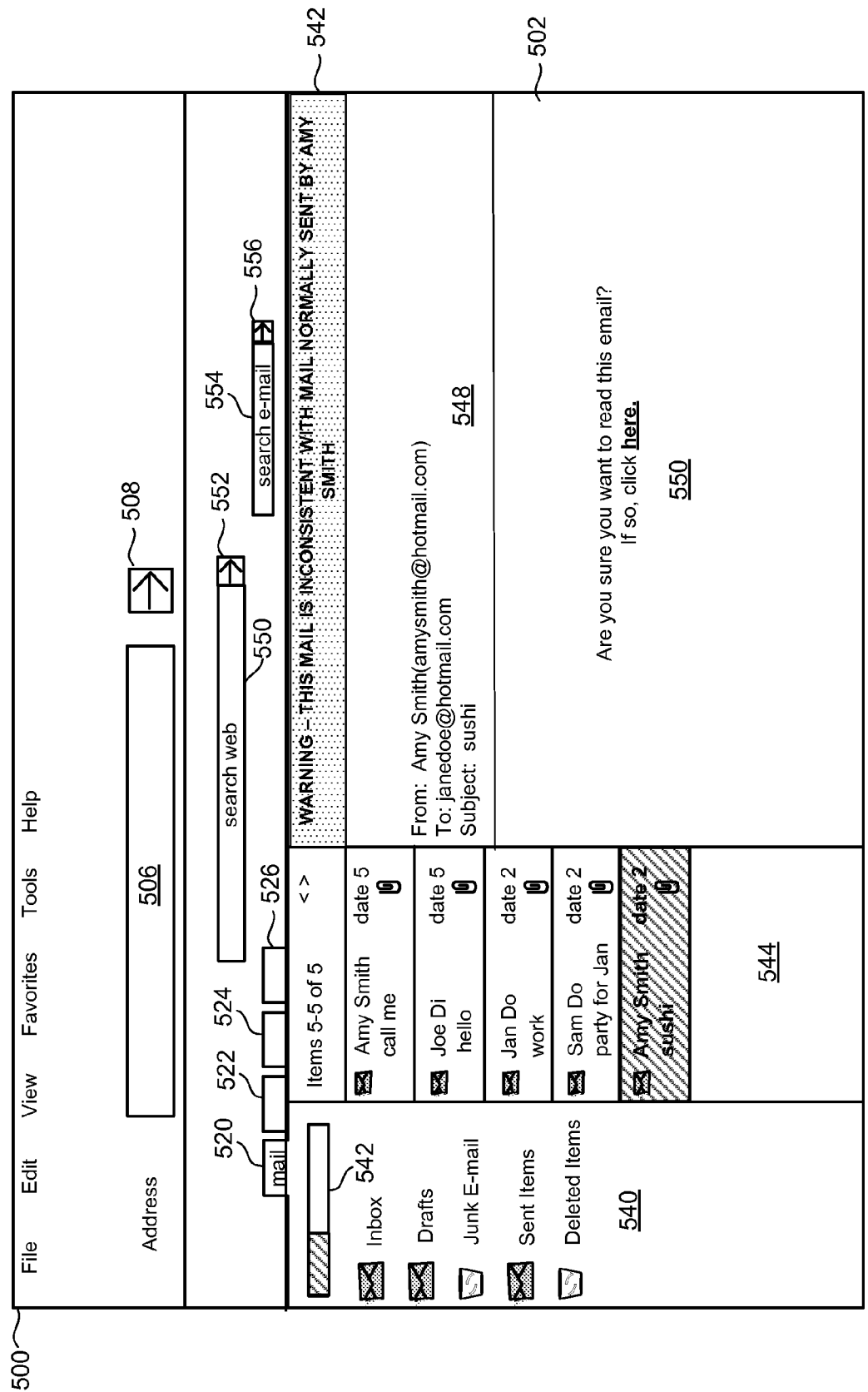
FIG. 5 depicts an exemplary warning interface.

FIG. 5 shows the first example of a warning which may be provided at step 34. FIG. 5 shows an interface such as that which may be available in Windows Live Mail in a browser window 500. The browser window includes an address field 506 and a go button 508, a plurality of tabs 520, 522, 524, 526 allowing the user to transfer the view to different pages of the application shown in window 500. A menu 540 allows the user to select various folders (Inbox, Drafts, Junk E-Mail, Sent Items, Deleted Items) in the email application 502. An email message 502 is indicated as being from "Amy Smith" at an email address of "amysmith@hotmail.com". This is shown in a header field 548. A warning bar 542 indicates that the determination made at step 30 is that email normally received from amysmith@hotmail.com does not match the particular characteristics previously seen for this user. Optionally, in addition, in the message field 550 where the content of message would normally appear, a warning requesting the user to take another step to actually view the email, displaying the warning: "Are you sure you want to view this email? If so, click here." To view the mail, the user must to take the affirmative step of clicking in the window to actually view a potentially dangerous email. It will be recognized that a number of different warnings may be provided. In an alternative to the example shown in FIG. 5, the "subject," "to" and "from" fields 548 need not be shown.

Figure 6:
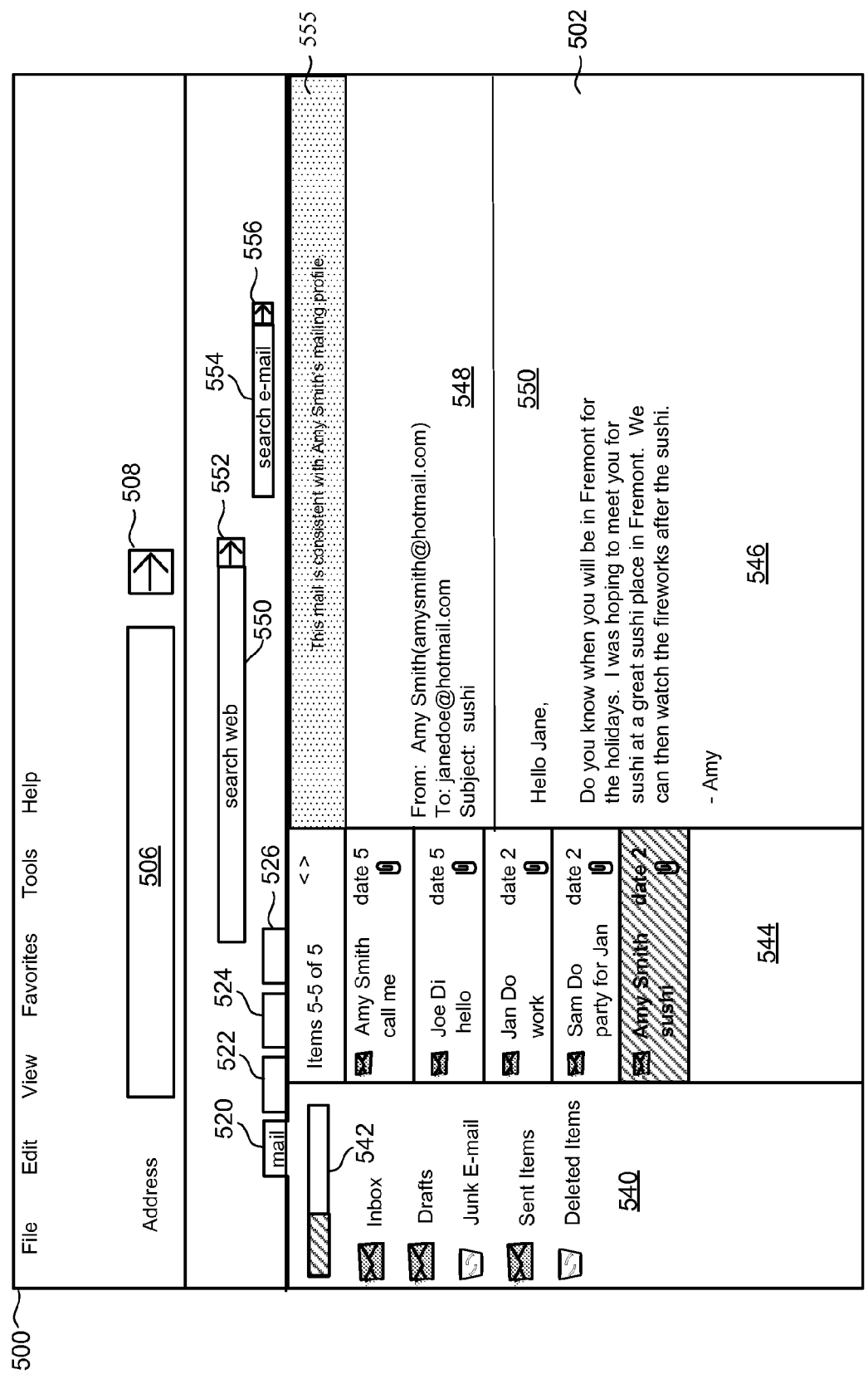
FIG. 6 depicts an exemplary re-assurance interface

In an alternative embodiment, a validation such as that shown in FIG. 6 may be provided. In FIG. 6, a reassuring message 555 indicates that this mail is consistent with Amy Smith's mailing profile.

In yet another embodiment, not illustrated a warning may provide a detailed description of the characteristic or identifier which failed a pattern match, allowing for further analysis by the user or the system administrator.

The client devices and servers discussed above may be implemented in a processing device such as that described with respect to FIG. 6. With reference to FIG. 6, an exemplary system for implementing the technology includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

Figure 7:
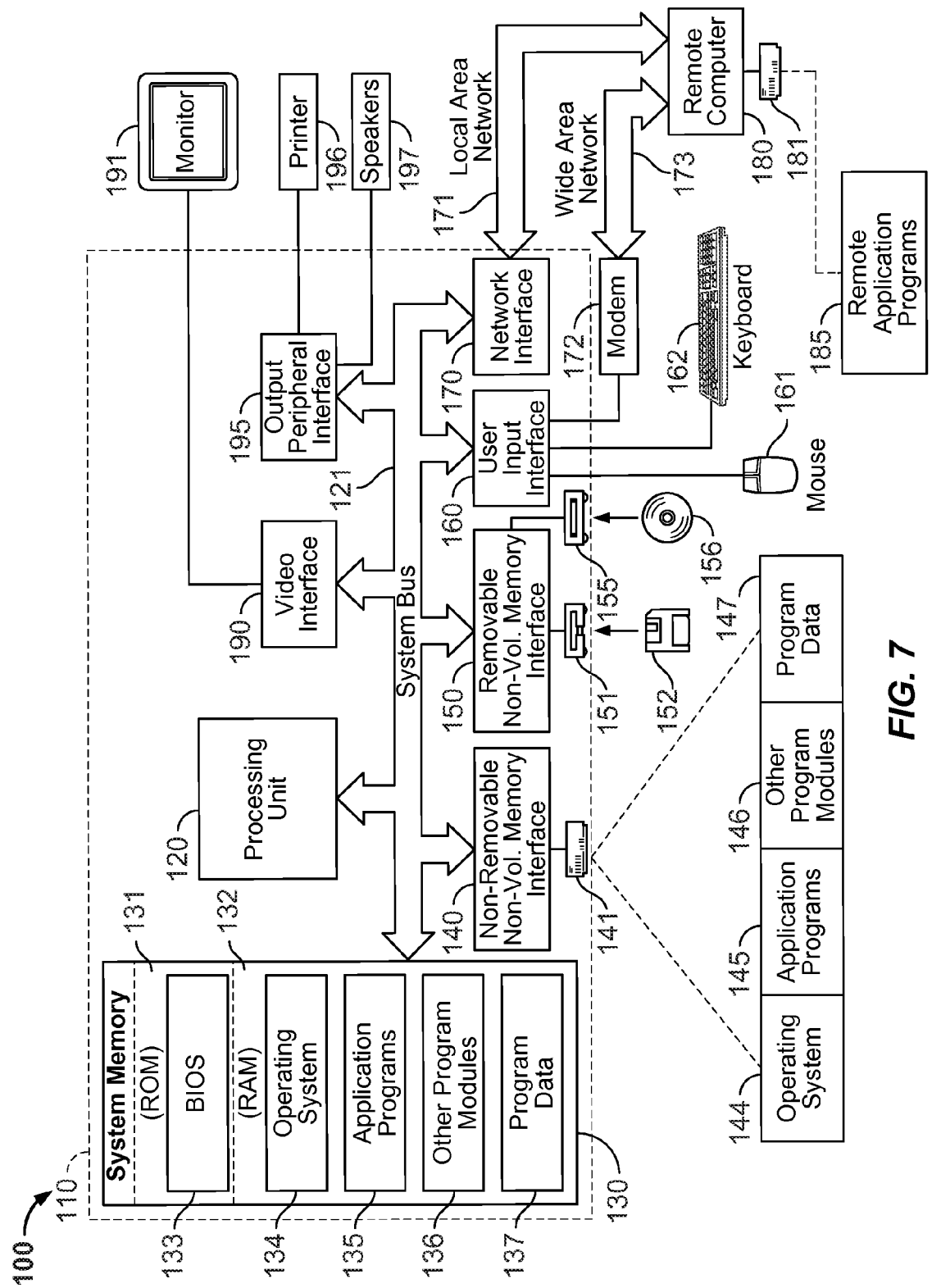
FIG. 7 depicts a processing system suitable fur use in the systems described with respect to FIG. 3 or 4.

The drives and their associated computer storage media discussed above and illustrated in FIG. 7, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

The present technology provides users with a warning when email received from different sources deviates from known patterns. In the technology herein, the characteristics of mail regularly received are observed and flagged when deviated from. This is done on a per origin basis so that the "usual and customary" level of authentication form an alarm system. Such characteristics can include whether or not the email passed a sender I.D., whether or the email passes DKIM, or whether it comes from the same IP address or group of IP addresses. Basic patterns of emails can be learned. This can be broadened to include text patterns and other characteristics of a particular email. Advantageously, this is done on a per user basis Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer implemented method for assisting email users, comprising:

receiving a plurality of email messages, each message addressed to at least one email user and identifying a sender identity;

recording a plurality of characteristics associated with each email sent from a sender identity;

determining whether characteristics of new emails purported to be received from the sender identity match characteristics of a plurality of previously received emails from the sender identity, the determining performed after a user views an email in the interface, and a known good pattern is established when at least a plurality emails from the sender identity share the same plurality of characteristics when the user reads the email;

presenting at least a portion of a received new email message to the user in a user interface, the user interface including a set of user actions which may be performed by the user via the user interface; and if the characteristics in the received new email message do not match the characteristics recorded for the plurality of previously received emails from the sender identity, transforming the user interface to include an indication along with at least a portion of the message field of the email, associated with the received new email message, to the at least one email user, that the received new email message purported to be from the sender identity is not likely to be from the sender identity and enabling further actions on the received new email message in the user interface, the indication comprising a warning which includes a first greater severity when a pattern of matching a stronger characteristic is not matched and a lesser severity when a pattern of matching a weaker characteristic is not matched, and if the characteristics in the received new email message match the characteristics recorded, not transforming the user interface.

2. The computer implemented method of claim 1 wherein the characteristics comprise one or more of: whether or not an email passes a Sender ID authentication or whether or not an email passes DomainKeys Identified Mail authentication; whether or not an email is received from one or more Internet Protocol addresses; one or more elements in an email header; and/or a text characteristic in emails from the sender identity.

3. The method of claim 1 wherein a first characteristic is an email from a source identifier regularly passing Sender ID or DomainKeys Identified Mail authentication and a second characteristic is an email regularly coming from an Internet Protocol address.

4. The method of claim 1 wherein the sender identity comprises one or: an email address or a group of email addresses.

5. The method of claim 1 wherein the sender identity comprises one of: an Internet Protocol address or a group of Internet Protocol addresses.

6. The method of claim 5 wherein a group of Internet Protocol addresses results from one or more of: a WHOIS query based on at least two known good IP addresses; a BGP query based on at least two known good IP addresses; a common domain part from a reverse DNS query resulting from at least two IP addresses.

7. A computer implemented method for classifying emails according to source, comprising:
receiving a plurality of email messages, each message addressed to at least one email user and identifying a sender identity;
presenting newly received emails addressed to the at least one email user in an user interface for the user, the user interface including a set of available actions;
monitoring whether a user selects to view a received email message from the sender identity in the user interface;
extracting one or more characteristics from each received email message associated with the sender identity after the user selects to view a first email message from the sender identity in the user interface;
determining whether the one or more characteristics associated with the received email selected matches one or more known good characteristics of a plurality of other messages received for the sender identity to establish a pattern of characteristics for messages a user views from the sender identity, the determining performed after a user views an email in the interface, and a known good pattern is established when at least a plurality emails from the sender identity share the same plurality of characteristics when the user reads the email; and
receiving a new email for the user from the sender identity and if the one or more characteristics of the new email do not match the pattern, transforming the user interface to include an at least a portion of the message field of the message along with an indication, associated with the new email, to the at least one email user, of whether the received email is likely to be from the sender identity and enabling an action on the email, the indication comprising a warning which includes a first greater severity when a pattern of matching a stronger characteristic is not matched and a lesser severity when a pattern of matching a weaker characteristic is not matched, and if the characteristics in the received new email message match the characteristics recorded, not transforming the user interface.

8. The computer implemented method of claim 7 wherein the action comprises displaying a visual indicator in the interface to indicate potential email problems to the user.

9. The computer implemented method of claim 7 wherein the characteristics comprise one or more of: whether or not an email passes a Sender ID authentication; whether or not an email passes DomainKeys Identified Mail authentication; and/or whether or not an email is received from one or more Internet Protocol addresses.

10. The method of claim 7 wherein the source comprises at least one of an email address or a group of email addresses.

11. The method of claim 7 wherein the source comprises one of: an Internet Protocol address or a group of Internet Protocol addresses.

12. The method of claim 7 wherein the characteristics comprise a text characteristic in emails from the source.

13. The computer implemented method of claim 7 further including the step of automatically white-listing the email address.

14. A computer implemented method for assisting email users of an enterprise service provider email system, comprising:
receiving a plurality of email messages in the enterprise service provider email system, each message addressed to at least one email user and identifying at least one sender identity having an email address;
presenting emails addressed to the at least one email user in a user interface for the user;
gathering a plurality of identifying characteristics for the plurality of emails received at the enterprise service provider email system from an email address directed to a plurality of users in a group of users after one user in the group selects to view a first email from the email address;
establishing a pattern of identifying characteristics for emails from the at least one sender identity based on group actions;
determining whether a new received email purported to be from the sender identity and directed to the at least one email user matches the pattern of identifying characteristics associated with the at least one sender identity, the determining performed after a user views an email in the interface, and a known good pattern is established when at least three emails from the sender identity share the same plurality of characteristics when the user reads the email; and
upon the user viewing the new email, transforming the user interface to provide a portion of the message field and to visually indicate to the user that the new received email is not likely from the sender identity when identifying characteristics of the new email do not match the pattern of identifying characteristics by providing a warning which includes a first greater severity when a pattern of matching a stronger characteristic is not matched and a lesser severity when a pattern of matching a weaker characteristic is not matched, and enabling an action on the email in the user interface.

15. The computer implemented method of claim 14 wherein the step of indicating includes indicating one of a match with previous characteristics and a non-match with previously gathered characteristics.

16. The computer implemented method of claim 14 wherein the characteristics comprise one or more of: whether or not an email passes a Sender ID authentication; whether or not an email passes DomainKeys Identified Mail authentication; whether or not an email is received from one or more Internet Protocol addresses; and/or a recurring text pattern in emails from the sender identity.

\* \* \* \* \*